Figure 1:
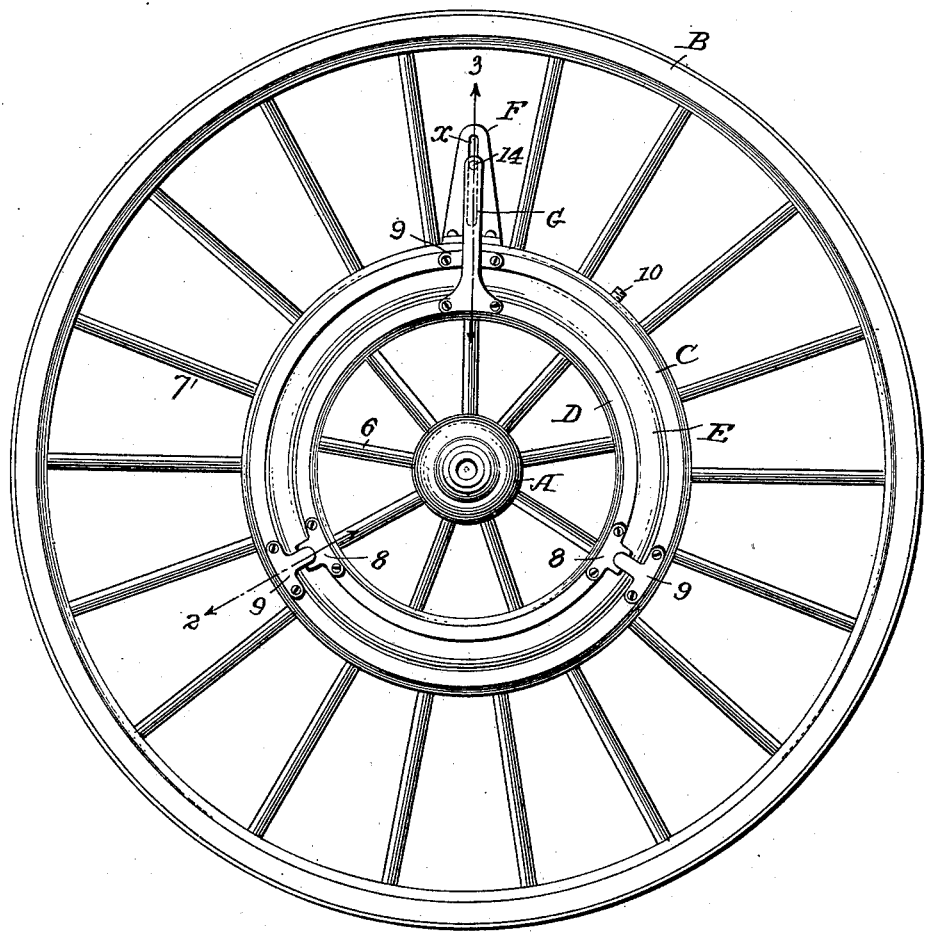

No. 673,390.  
J. P. ERIE.  
WHEEL FOR VEHICLES.  
(Application filed May 12, 1898.)  
Patented May 7, 1901.

(No Model.)

2 Sheets—Sheet 1.

Witnesses  
Inventor  
James Philip Erie  
Attorneys

No. 673,390. Patented May 7, 1901.
J. P. ERIE.
WHEEL FOR VEHICLES.
(Application filed May 12, 1898.)
(No Model.) 2 Sheets—Sheet 2.
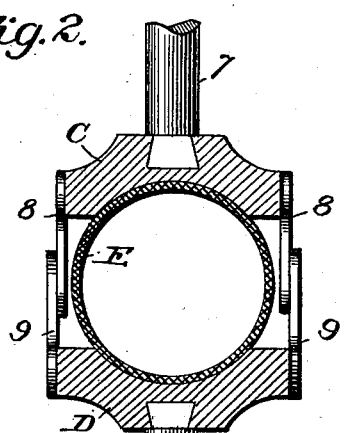
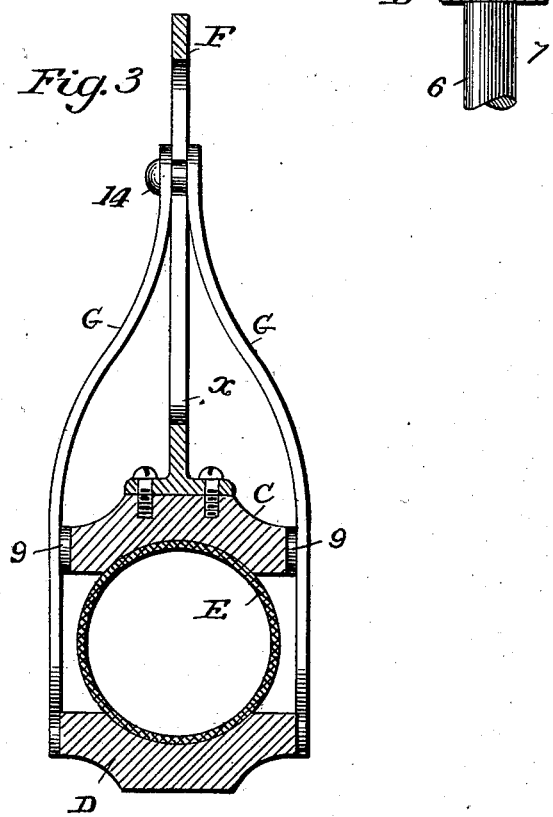

UNITED STATES PATENT OFFICE.

JAMES PHILIP ERIE, OF LOS ANGELES, CALIFORNIA, ASSIGNOR TO THE ERIE PNEUMATIC HUB COMPANY, OF SAME PLACE.

WHEEL FOR VEHICLES.

SPECIFICATION forming part of Letters Patent No. 673,390, dated May 7, 1901.

Application filed May 12, 1898. Serial No. 680,476. (No model.)

*To all whom it may concern:*

Be it known that I, JAMES PHILIP ERIE, a citizen of the United States, residing at Los Angeles, in the county of Los Angeles and State of California, have invented certain new and useful Improvements in Wheels for Vehicles, of which the following is a specification.

My invention relates to wheels for vehicles, and more especially to that class of wheels in which there are pneumatic cushions between the axles and the rims; and my invention has for its object to obviate certain objections to this class of wheels, to which end I construct the same as fully set forth hereinafter and as illustrated in the accompanying drawings, in which—

Figure 1 is a side view of a buggy-wheel provided with my improvement; Fig. 2, an enlarged section on the line 2 2, and Fig. 3 an enlarged section on the line 3 3.

The wheel is provided with a hub A and a rim B, each of any suitable construction and character, and intermediate of the hub and the rim are two grooved annular bearings or rings C D. The bearing D is connected with the hub A through the medium of spokes 6 of any suitable character and arrangement, and the bearing C is connected with the rim B through the medium of the spokes 7 of any suitable character and arrangement, so that there are practically an inner and an outer wheel-section, and between these two sections, fitting the grooves of the bearings C D, is interposed a pneumatic cushion E of any suitable character, which may be filled through the medium of the usual filling-tube 10, extending through one of the bearings. Suitable devices are employed to preserve the relations of the two parts of the wheel in the same plane. For instance, bearing-plates 9, with inward extensions, are secured to the rim C, and bearing-plates 8, with outward extensions, are secured to the rim of the bearing D, as shown, these pairs of bearing-plates being upon opposite sides and at any suitable intervals. With the parts arranged as above described there would be opportunity for such radial movements of the inner section of the wheel in respect to the outer section as would take up the vibrations and jars incident to wheels throughout their structure; but there would also be an opportunity for the inner section to turn as well as move radially, which would result in such strains and wear upon the interposed pneumatic cushion as would be extremely detrimental. I have found by experience that it is essential in a wheel of this character that one section shall be capable of moving freely to a limited extent radially in all directions; or, in other words, when the wheel is in use that the center section shall be capable of a vertical movement throughout all its parts at any time; but that it is also essential that there shall be practically no rotation or turning of one section independently of the other. In order to prevent such turning and at the same time permit such radial or vertical movement, I provide a connection between the two rings or bearings C D, which I will now describe. As shown, the said connection is in the form of an arm G, (or there may be two arms, one on each side of the wheel, as shown in Fig. 3,) extending from the inner ring or bearing D and having a pivoted sliding connection with the outer ring. As shown in Figs. 1 and 3, the arm has a rounded pin or stud 14 at its outer end, which extends through a slot *x* in a slotted bracket F, secured to the rim of the outer ring or bearing C. In this construction the arm G can move radially outward and inward, and at the same time it can oscillate or swing upon the pin 14, situated at a distance from the outer ring, to any necessary extent, whereby the inner section of the wheel can move vertically throughout its entire extent at any point of rotation of the wheel. The inner ring can move radially in any direction to any necessary extent, while it is practically prevented from turning in the other ring, so that there is no torsional strain upon the cushion E.

As the result of the above-described construction and arrangement of parts I have found that the efficiency of the cushion in relieving the vehicle, supported by the axle, from jars, strains, and oscillations is fully maintained at all times. There is no point in the rotation of the wheel in which a vertical or any other shock is communicated from the outer to the inner portion except through the medium of the cushion, and there are no torsional strains whatever upon the cushion.

While I have shown my invention in connection with a wheel of such a character as is best adapted for buggies or heavier vehicles, the same combination of parts, with such structural alterations as the necessity of the case demands, may be employed with equal efficiency in wheels for bicycles, tricycles, and other light vehicles.

While I have described a wheel having a single set of bearings or rings C D, in some instances for ambulances, &c., there may be an additional set and an additional pneumatic cushion.

Without limiting myself to the precise construction and arrangement of parts shown, I claim as my invention—

In a vehicle-wheel, the combination of the hub and the rim, with two concentric rings located between the hub and rim, spokes connecting the inner of said rings with the hub, spokes connecting the outer of said rings with the rim, an elastic cushion fitted between said rings, overlapping plates 8 and 9 secured to the respective rings, said plates being free to slide one upon the other radially, a slotted plate F rigidly secured to one of said rings, an arm G rigidly secured to the other of said rings and a stud 14 on the arm G projecting through the slot in plate F, substantially as set forth.

In testimony whereof I have signed my name to this specification in the presence of two subscribing witnesses.

J. PHILIP ERIE.

Witnesses:
W. CLARENCE DUVALL,
CHARLES ELWOOD FOSTER.